United States Patent [19]

Zingaro

[11] 3,935,464

[45] Jan. 27, 1976

[54] MULTIPLE CATHODE GAS PROPORTIONAL DETECTOR

[76] Inventor: William P. Zingaro, 22 Clubway, Hartsdale, N.Y. 10530

[22] Filed: Dec. 17, 1973

[21] Appl. No.: 425,246

[52] U.S. Cl. .................................. 250/379; 250/385

[51] Int. Cl.[2] ........................................... G01T 1/18

[58] Field of Search ...... 250/374, 379, 385; 313/93, 313/188, 192, 196

[56] References Cited

UNITED STATES PATENTS

| | | | |
|---|---|---|---|
| 2,745,970 | 5/1956 | Dewan | 250/385 X |
| 2,957,084 | 10/1960 | Marr et al. | 250/385 |
| 3,230,372 | 1/1966 | Spacklen | 250/385 |
| 3,297,897 | 1/1967 | Lewis et al. | 250/379 X |
| 3,569,767 | 3/1971 | Benson | 250/379 X |
| 3,603,831 | 9/1971 | Kimmel | 250/379 X |

*Primary Examiner*—Davis L. Willis
*Attorney, Agent, or Firm*—Carl P. Steinhauser

[57] ABSTRACT

A detector for ionizing radiation comprising a generally cylindrical enclosure which contains an ionizable gas, a central wire which with a peripheral wall constitute the electrodes of the device, and a window to permit entry of ionizing radiation. With appropriate potentials applied to the central wire and peripheral wall, ionizing radiation produces electrons which are attracted to the central wire and positive ions which are attracted to the peripheral wall in proportion to the intensity of the radiation. One or more auxiliary electrodes are provided which extend parallel to and between the central electrode and the peripheral wall. An appropriate potential is applied to this auxiliary electrode to neutralize the positive ions.

7 Claims, 8 Drawing Figures

MULTIPLE CATHODE GAS PROPORTIONAL DETECTOR

The invention relates to a detector for ionizing radiation and in particular to a detector in which the response is proportional to both the intensity and the energy of the radiation. The term "radiation" is to be understood to include charged particles.

BACKGROUND OF THE INVENTION

A gas proportional counter is an x-ray detector used principally for the measurement of radiation of light elements (wave-lengths greater than 2A).

Such a counter consists of a metal cylindrical chamber closed at both ends and a very thin metal wire, usually tungsten, positioned along the axis of the cylinder to which a high potential, e.g. 1500–2000v is applied. The cylindrical wall is grounded so that the wall constitutes a cathode and the central wire an anode.

An aperture in the wall, sealed with an aluminized plastic wall (e.g. Mylar) a registered trademark of E. I. DuPont de Nemours for a polyethylene terephthalate resin serves as a window (with a minimum of absorption of incoming radiated).

The counter is filled with an ionizable gas, generally argon-methane. To compensate for the effects of loss of gas through the window a flow of gas through the counter may be provided.

X-ray quanta passing through the window ionize the gas which consists of producing pairs of ions (electrons + positive ions). Very little energy is required to ionize the gas, usually of a few electron volts depending on the nature of the gas used. This energy, called "ionization potential" is 26.4 eV for argon. The maximum number of pairs of ions formed is given by the expression:

$$n = \frac{E}{e}$$

where $n$ = number of ion pairs, $E$ = radiation energy is electron volts, and $e$ = effective ionization potential. The electrical field originating from the difference in potential between the electrode of the counter makes it possible to separate these ion pairs.

The field causes electrons to move towards the anode (central wire) and the positive ions towards the cathode. The primary electrons may collide with other gas atoms and can ionize them. If the kinetic energy of the electron is large enough, a new electron, in addition to the primary electron, will be released after the collision and will in turn collide with gas atoms and release new electrons. This process can continue producing gas amplification.

The region where this ionization takes place in an avalanche is defined by a critical field strength value for which the acceleration of electrons between two collisions is sufficient to cause ionization. As the electrical field strength inside the counter is dependent on the inverse of the logarithm of the ratio of the counter- and the anode diameters, the field strength decreases very quickly with distance from the anode and the region in which ionization avalanches occur is very close to the anode.

As electrons reach the central wire, or anode, a current pulse is produced which can be in an output circuit. Each such pulse corresponds then to an ionization event and the efficiency of the counter is a measure of the number of counts it can produce in response to ionizing radiation.

In addition, the pulse height or size depends on the primary ionization and this makes possible the discrimination between radiation types which differ in the primary ionization that is produced. Thus, the resolving power of the counter can be expressed in terms of the ratio in % of the width (b) at half maximum to the average pulse height (a), or:

$$\text{Resolution} = \frac{b}{a} \times 100\%$$

Because of statistical fluctuations, particularly in the primary ionization, the size of the pulses measured for one element is not constant. However, the statistical fluctuations follow the Gaussian law which makes it possible to define the theoretical resolution $R_{Th}$ of the counter and this can be shown to be:

$$R_{Th} = \sqrt{4.5\lambda e}$$

where $\lambda$ is the wave-length of the ionizing radiation and $e$ is the effective ionization potential of the gas.

Positive ions, because of their mass, move slowly toward the grounded cathode. As a result, a positive ion sheath is formed which alters the electrical field between the anode wire and cathode. Because of this condition, the functioning of the detector is affected in various ways. The most serious are an increase in detector dead time and a shift in the pulse amplitude.

The dead time refers to the intervals during which the detector is not active. The measured count rate, therefore, will be lower than the true count rate.

The shift in pulse amplitude affects the application of pulse height selection since pulses will move progressively outside the window setting of a pulse height analyzer, which is conventionally used to select pulses of given amplitude, as the counting rate increases. The result is a serious decrease in the true rate.

It is a principal object of the invention to provide a counter for detecting ionizing radiation having an improved resolution approaching the theoretical value.

It is a further object of the invention to provide a gas counter for detecting ionizing radiation having reduced dead time.

It is a still further object of the invention to provide a gas counter for detecting ionizing radiation which produces pulses of suitable amplitude for proportional counting.

It is yet another object of the invention to provide an improved gas counter for detecting ionizing radiation in which the positive ion sheath is utilized to control the operation of the counter more effectively, and to control a source of ionizing radiation.

SUMMARY OF THE INVENTION

The foregoing and other objects and advantages of the invention are attained by providing one or more auxiliary, or secondary cathodes between the anode and primary cathode to provide conducting paths to ground, or the primary cathode, between the latter and the anode. The secondary, or auxiliary, cathodes are maintained at different potentials with respect to the primary cathode. Under these conditions, the heavy positive ions are more readily neutralized thus reducing their effect on the electrical field strength on the detector. At high counting rates the density of the positive ions modify the field sufficiently to cause changes in pulse amplitude and increase dead time. The presence of the secondary, or auxiliary, cathodes serves to neutralize the positive ion sheath and thereby overcomes these significant disadvantages.

The secondary cathodes are connected to the primary cathode through a circuit arrangement including a parallel resistance-capacitance network. During operation of the detector, a small, but measurable current, proportional to the count rate, flows from the secondary to the primary cathode. This signal current can be used to control and adjust detector operating parameters such as the anode voltage, or where practical, to control the source of ionizing radiation.

DETAILED DESCRIPTION OF THE INVENTION

The invention will be described with reference to the accompanying drawing in which.

Figure 1:
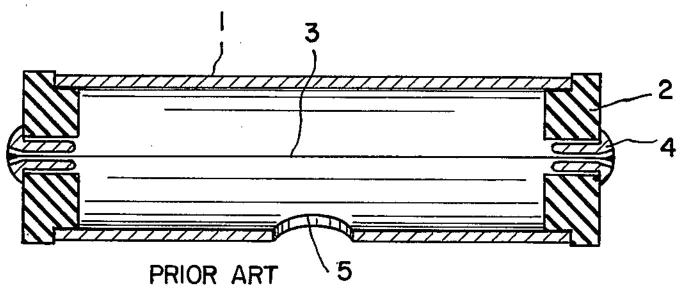
FIG. 1 is sectional view of a standard gas proportional counter.

A standard gas proportional counter (FIG. 1) comprises a cylindrical metal casing 1 which serves as a cathode, closed at both ends by plugs 2 usually consisting of Teflon a registered trademark for E. I. Dupont de Nemours for a TFE-Fluorocarbon Wire Enamels, or similar insulating material. An axial wire 3, which serves as an anode extends through the end walls and is sealed therein by bead 4. A thin window of Mylar 5 covered with aluminum is provided in an aperture in the wall of the casing which serves as a window for the incoming radiation. The counter is filled with an argon methane mixture, and a positive potential of about 1500–2000 volts is applied to the anode while the cathode is grounded.

Figure 2:
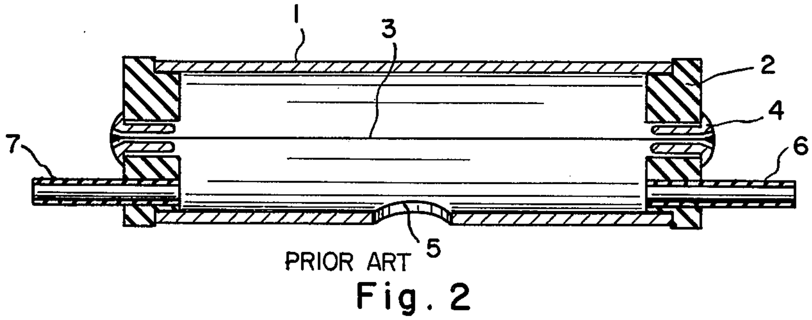
FIG. 2 is a sectional view of a standard gas flow proportional counter.

FIG. 2 shows a variant of the standard counter in which a gas inlet 6 and a gas outlet 7 are provided in order that a gas flow through the counter can be maintained to replenish any gas lost through the window.

Figure 3:
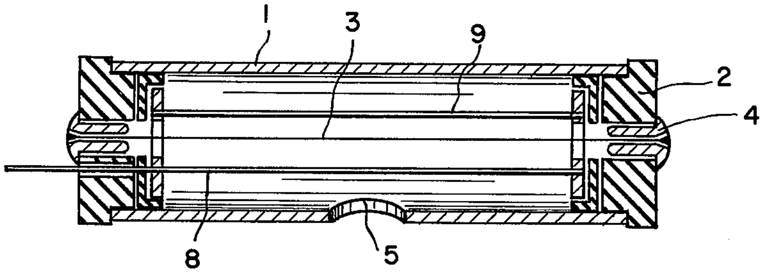
FIG. 3 is a sectional view of a gas proportional counter according to the invention.
Figure 4:
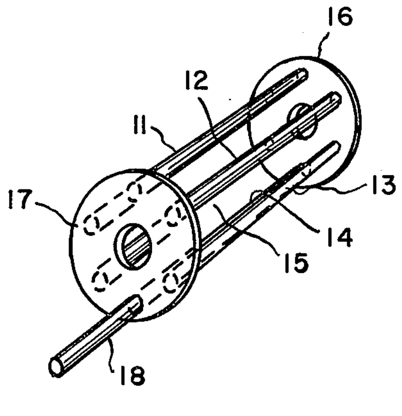
FIG. 4 shows the secondary cathode structure of the detector shown in FIG. 3

In the gas proportional counter according to the invention shown in FIG. 3, additional cathode, also referred to as a secondary cathode 8 extends parallel to and between the anode 3 and the cathode 1, hereinafter referred to as the primary cathode. The secondary cathodes 8 and 9 are at a positive potential relative to the primary cathode but at a lower potential than the anode.

Figure 5:
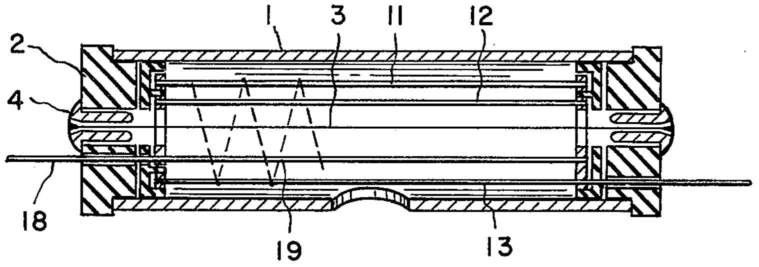
FIG. 5 is still another embodiment of a detector according to the invention shown partly in section.

The secondary cathodes 11, 12, 13, and 14 may be arranged as a squirrel cage 15 between metal discs 16 and 17 which serve as end supports. A terminal conductor 18 connects the squirrel cage 15 to external circuitry. A spiral grid 19 may be wound around the secondary cathodes as shown in FIG. 5 to further enhance the effect of the secondary cathodes.

Figure 6:
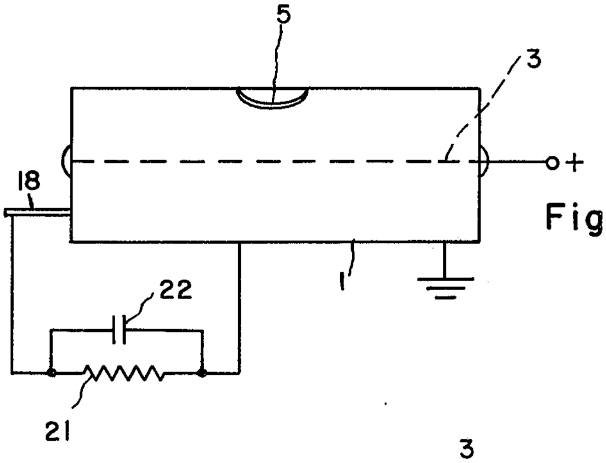
FIGS. 6 and 7 show circuits for connecting the secondary cathode to the primary cathode.

An important feature of this invention is the external circuitry used in connection with the secondary cathode. While the precise operation of the novel detector, especially the secondary cathode, is not fully understood, it is believed that the secondary cathode with a lower positive potential than the anode applied thereto in effect draws off positive ions and neutralizes the ion sheath that is formed, it has been found essential to connect the secondary cathode either to the primary cathode (which is at ground potential) or to ground through a parallel resistance capacitance network. The absence of this network, or the use of a series connected resistor-capacitor combination appears to be inoperative. This is shown in FIG. 6 where the secondary cathode terminal 18 is connected to the primary cathode, through a resistor 21 and a capacitor 22 in parallel. The usual high positive potential is applied to the anode.

Figure 7:
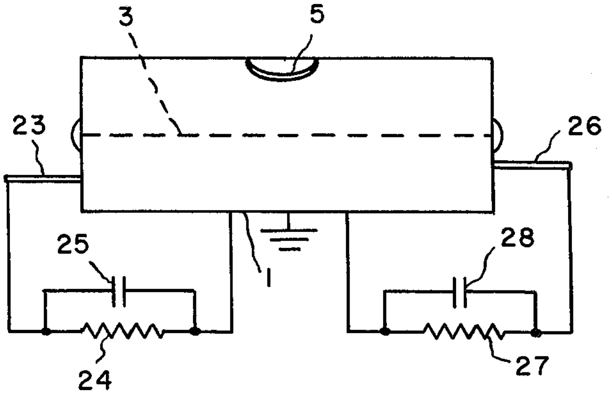

If two or more cathodes are present, each may be connected to the primary cathode 1 through a separate parallel resistance-capacitance network as shown in FIG. 7. There, one secondary cathode terminal 23 is connected to primary cathode 1 through a resistor 24 and capacitor 25 in parallel while another secondary cathode is connected through its terminal 26 to the primary cathode through a resistor 27 and a capacitor 28 connected in parallel.

Figure 8:
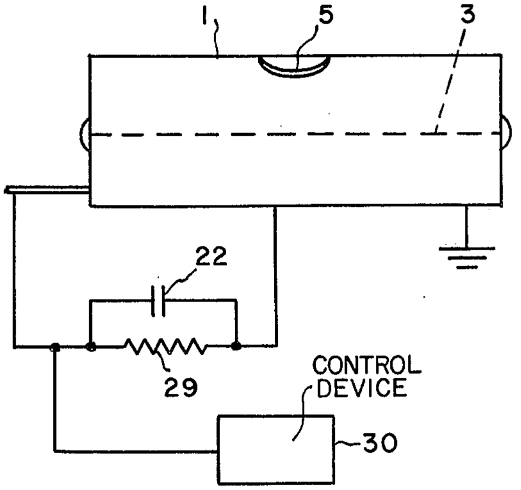
FIG. 8 shows a circuit for connecting the primary and secondary cathodes which includes a control device for adjusting operating parameters of the detector.

A small, but measureable current proportional to the count rate has been found to flow in the connection between the secondary cathode and the primary cathode. This current flowing through resistor 29 (FIG. 8) develops a voltage which can be used to actuate a control device 30. This control device may adjust the anode potential, regulate gas flow, or control a source of ionizing radiation.

Using the detector according to the invention with an $Fe^{55}$ source of ionizing radiation, the pulse height distribution for this radiation was very close to the theoretical value. Since $Fe^{55}$ radiation is equivalent to Mn Ka x-rays, it seems reasonable to conclude that the more common x-ray tube targets such as copper and chromium will also result in maximum resolution. Gas flow counters might also be used extra-terrestially aboard satellites or space vehicles to detect ionizing radiation more efficiently and effectively.

What is claimed is:

1. A pulse-type detector for detecting ionizing radiation comprising a substantially cylindrical envelope having a wall constituting a substantially cylindrical electrode coaxial with said envelope and having a window therein for admitting ionizing radiation, an ionizable gas within said envelope, said cylindrical envelope being closed at both ends by end walls, a central wire electrode extending axially within said envelope, an auxiliary electrode disposed between said central wire electrode and the wall electrode, means to apply a negative potential between said wall electrode and said central wire electrode at which electrical pulses proportional to the intensity and energy of radiation absorbed by the gas are produced, and means comprising a parallel resistance-capacitor network to apply a negative potential between said wall electrode and said auxiliary electrode at which positive ions produced when said gas is ionized are neutralized by said auxiliary electrode, said negative potential between said wall electrode and said auxiliary electrode being less than said negative potential between said wall electrode and said central wire electrode.

2. A detector as claimed in claim 1 in which said auxiliary electrode includes a plurality of wires extending parallel to and between said central wire and said cylindrical electrode.

3. A detector as claimed in claim 2 in which a spiral wire is wound around said auxiliary electrode.

4. A detector as claimed in claim 1 in which said central wire electrode extends through said end-walls.

5. A detector as claimed in claim 1 including means to apply a first positive potential to said central wire relative to said cylindrical electrode and means to apply a second and smaller positive potential to said auxiliary electrode.

6. A detector as claimed in claim 1 in which said cylindrical envelope includes gas inlet and outlet means for flowing a gas through said enclosure.

7. A detector as claimed in claim 1 including a control device connected between said auxiliary electrode and said cylindrical electrode for adjusting an operating parameter of the detector.

* * * * *